2,883,402
Patented Apr. 21, 1959

2,883,402

6α-METHYL - 11β,21 - DIHYDROXY -4- PREGNENE-3-ONE AND 21-HYDROCARBON CARBOXYLIC ACID ESTERS THEREOF

Barney J. Magerlein and George B. Spero, Kalamazoo, Mich., assignors to The Upjohn Company, Kalamazoo, Mich., a corporation of Michigan No Drawing. Application August 18, 1958
Serial No. 755,433

3 Claims. (Cl. 260—397.45)

This invention relates to certain novel compounds, more particularly to 6α-methyl-11β,21-dihydroxy-4-pregnene-3-one, which may be represented by the formula:

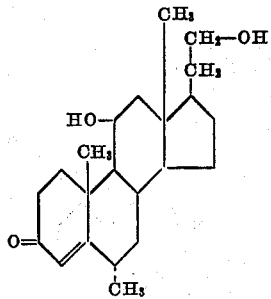

its 21-hydrocarbon carboxylic acid esters and to a process for their production.

According to this invention, 3,11-diketo-6β-methyl-4,17(20)-[cis]-pregnadien-21-oic acid lower-alkyl, preferably methyl or ethyl ester [Spero et al., J. Am. Chem. Soc., 78, 6213 (1956)] is ketalized with a lower-alkylene glycol, preferably ethylene glycol, in the presence of a ketalization catalyst, according to ketalization methods well known in the art (U.S. 2,707,184) to produce the corresponding 3-ketal. The 11-keto group is then selectively reduced with sodium borohydride in the presence of alkali under the usual conditions to produce the corresponding 3-ketal of 3-keto-6-methyl-11β-hydroxy-4,17-(20)-[cis]pregnadiene-21-oic acid lower-alkyl ester. The next step involves the reduction of the side chain with sodium to a β-hydroxyethyl group to produce a 3-lower-alkylene glycol ketal of 6-methyl-11β,21-dihydroxy-4-pregnen-3-one. The 3-lower-alkylene glycol ketal group is then hydrolyzed with dilute aqueous acid to produce 6α - methyl - 11β,21 - dihydroxy - 4 - pregnene - 3 - one. This compound and its 21-hydrocarbon carboxylic acid esters possess useful pharmacological activity, including central nervous system depressant activity, including sedative, hypnotic and tranquilizer activity. Administration can be in conventional dosage forms, e.g., pills, tablets, capsules, syrups or elixirs for oral use, liquid forms which are adaptable for injectable products, e.g., aqueous suspension or oil solution or emulsion and the like, with or without coacting materials forming advantageous combinations therewith.

The following examples are illustrative of the process and products of this invention but are not to be construed as limiting.

EXAMPLE 1

*The 3-ethylene ketal of 3,11-diketo-6-methyl-4,17(20) [cis]-pregnadien-21-oic acid methyl ester*

A mixture of 1.0 gram of 3,11-diketo-6β-methyl-4,17-(20)-[cis]-pregnadien-21-oic acid methyl ester, ten milligrams of para-toluensulfonic acid, five milliliters of ethylene glycol and 100 milliliters of benzene was heated under reflux for five hours with vigorous stirring. The water formed was removed by co-distillation with the benzene. The cooled reaction mixture was washed with aqueous sodium bicarbonate and then dried. The solvent was distilled leaving a residue of the 3-ethylene ketal of 3,11-diketo-6-methyl-4,17(20)-[cis]-pregnadien-21-oic acid methyl ester which, when recrystallized once from ethyl acetate, melted at 184 to 187 degrees centigrade. Further recrystallizations gave an analytical sample melting at 185 to 187 degrees centigrade and having an $[\alpha]_D$ of minus 35 degrees and the analysis below.

Calculated for $C_{23}H_{34}O_5$: C, 72.43; H, 8.27. Found: C, 72.26; H, 8.23.

Following the procedure of Example 1, but substituting other lower-alkylene glycols, e.g., propylene glycol, trimethylene glycol, butylene glycol, 2-butylene glycol, 2,4-pentanediol, 1,2-octanediol, for the ethylene glycol, there is produced the corresponding 3-ketal of 3,11-diketo-6-methyl - 4,17(20)-[cis]-pregnadien-21-oic acid methyl ester.

EXAMPLE 2

*The 3-ethylene ketal of 3-keto-6-methyl-11β-hydroxy-4,17(20)-[cis]-pregnadien-21-oic acid methyl ester*

To a solution of five grams of the 3-ethylene ketal of 3,11 - diketo - 6 - methyl - 4,17(20) - [cis] - pregnadien-21-oic acid methyl ester in 100 milliliters of propanol-2 was added twenty milliliters of 0.1 N sodium hydroxide and two grams of sodium borohydride. The mixture was stirred at 25 degrees centigrade for seventeen hours and then an additional fifty milliliters of propanol-2, five milliliters of 0.1 N sodium hydroxide and 0.5 gram of sodium borohydride was added and stirring was continued for an additional 24 hours. The solvent was distilled at reduced pressure and the residue was triturated with water and then recrystallized from a mixture of 100 milliliters of acetone and twenty milliliters of water to give 2.45 grams of the 3-ethylene ketal of 3-keto-6-methyl - 11β - hydroxy - 4,17(20) - [cis] - pregnadien-21-oic acid methyl ester melting at 140 to 144 degrees centigrade. Several recrystallizations from ethyl acetate gave an analytically pure sample melting at 150 to 151.5 degrees centigrade, having an $[\alpha]_D$ of minus 22 degrees in chloroform and the analysis below.

Calculated for $C_{25}H_{36}O_5$: C, 72.08; H, 8.71. Found: C, 72.09; H, 8.44.

Following the procedure of Example 2, but substituting as starting steroid another 3-lower-alkylene ketal, e.g., 3-propylene ketal, 3-trimethylene ketal, 3-butylene ketal, 3-(2'-butylene) ketal or 3-(2'-octylene) ketal, of 3,11-diketo - 6 - methyl - 4,17(20) - [cis] - pregnadien - 21-oic acid methyl ester, there is thus produced the corresponding 3-lower-alkylene ketal of 3-keto-6-methyl-11β-hydroxy - 4,17(20) - [cis] - pregnadien - 21 - oic acid methyl ester.

EXAMPLE 3

*The 3-ethylene ketal of 6-methyl-11β,21-dihydroxy-4-pregnen-3-one*

To a solution of 1.0 gram of the 3-ethylene ketal of 3 - keto - 6 - methyl - 11β - hydroxy - 4,17(20) - [cis]-pregnadien-21-oic acid methyl ester in ten milliliters of tertiary butyl alcohol and sixty milliliters of xylene was added 1.5 grams of sodium. The mixture was heated under reflux for two hours. The remaining sodium was destroyed by the addition of two milliliters of ethanol. Twenty milliliters of water was cautiously added and the solvent was removed by distillation at reduced pressure. There was obtained a residue of the 3-ethylene ketal of 6-methyl-11β,21-dihydroxy-4-pregnen-3-one.

Following the procedure of Example 3, but substituting as starting steroid another 3-lower-alkylene ketal, e.g., 3-propylene ketal, 3-(butylene) ketal, 3-(2'-butylene)

ketal, 3(octylene) ketal of 3-keto-6-methyl-11β-hydroxy-4,17(20)-[cis]-pregnadien-21-oic acid methyl ester there is thus produced the corresponding 3-lower-alkylene ketal of 6-methyl-11β,21-dihydroxy-4-pregnen-3-one.

EXAMPLE 4

*6α-methyl-11β,21-dihydroxy-4-pregnen-3-one*

The crude reaction product obtained in Example 3 was dissolved in 100 milliliters of acetone and sufficient 6 N hydrochloric acid was added to give an acidic test with pH test paper. The mixture was heated under reflux for thirty minutes, the solvent removed by distillation at reduced pressure and the residue extracted with methylene chloride. The methylene chloride solution was washed with water, dried and chromatographed over magnesium silicate (Florisil). The column was developed with hexanes (Skellysolve B) containing increasing proportions of acetone. The major fraction obtained was recrystallized from ethyl acetate to give 6α-methyl-11β,21-dihydroxy-4-pregnen-3-one melting at 182 to 184 degrees centigrade. An analytical sample was obtained by recrystallization from a mixture of acetone and hexanes which melted at 184 to 185.5 degrees centigrade, had an $[\alpha]_D$ of plus 96 degrees in chloroform and the analysis below.

Calculated for $C_{22}H_{34}O_3$: C, 76.26; H, 9.89. Found: C, 76.37; H, 9.82.

EXAMPLE 5

*6α-methyl-11β,21-dihydroxy-4-pregnen-3-one 21-acetate*

150 milligrams of 6α-methyl-11β,21-dihydroxy-4-pregnen-3-one was dissolved in two milliliters of pyridine and 1.5 milliliters of acetic anhydride and the mixture heated at forty degrees centigrade for four hours. The solution was cooled and then slowly diluted with water. The precipitated steroid was removed by filtration, washed with water and dried to give 6α-methyl-11β,21-dihydroxy-4-pregnen-3-one 21-acetate.

6α - methyl - 11β,21 - dihydroxy - 4 - pregnen - 3 - one is converted to other 21-esters by reaction with the appropriate acid anhydride, acid chloride or bromide or by other methods known in the art, e.g., by ester exchange, acid in the presence of an esterification catalyst, etc., to produce 6α-methyl-11β,21-dihydroxy-4-pregnen-3-one 21-acylates which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic 2, 3, or 4-methylbenzoic, 2,3-, 2,4- 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, etc.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 6α-methyl-11β,21-dihydroxy-4-pregnen-3-one represented by the formula:

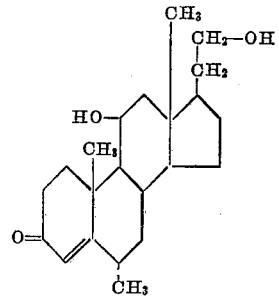

and 21-hydrocarbon carboxylic acid esters thereof containing from one to twelve carbon atoms, inclusive.

2. 6α-methyl-11β,21-dihydroxy-4-pregnen-3-one.

3. 6α-methyl-11β,21-dihydroxy-4-pregnen-3-one 21-acetate.

No references cited.